United States Patent
Ueno et al.

(10) Patent No.: US 12,522,220 B2
(45) Date of Patent: Jan. 13, 2026

(54) INFORMATION PROCESSING DEVICE

(71) Applicant: TOYOTA JIDOSHA KABUSHIKI KAISHA, Toyota (JP)

(72) Inventors: Hiroshi Ueno, Toyota (JP); Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 18/426,656

(22) Filed: Jan. 30, 2024

(65) Prior Publication Data

US 2024/0262369 A1 Aug. 8, 2024

(30) Foreign Application Priority Data

Feb. 7, 2023 (JP) .................. 2023-017029

(51) Int. Cl.
*B60W 40/09* (2012.01)
*B60W 30/16* (2020.01)

(52) U.S. Cl.
CPC ............ *B60W 40/09* (2013.01); *B60W 30/16* (2013.01); *B60W 2520/105* (2013.01); *B60W 2540/12* (2013.01); *B60W 2554/4041* (2020.02); *B60W 2554/4042* (2020.02); *B60W 2554/802* (2020.02); *B60W 2720/106* (2013.01); *B60W 2754/30* (2020.02)

(58) Field of Classification Search
CPC .... B60W 30/09; B60W 30/095; B60W 30/16; B60W 30/18109; B60W 40/00; B60W 40/09; B60W 2520/105; B60W 2540/12; B60W 2554/4041; B60W 2554/4042; B60W 2554/802; B60W 2720/106; B60W 2754/30

USPC ........................................... 701/96
See application file for complete search history.

(56) References Cited

U.S. PATENT DOCUMENTS

| | | | |
|---|---|---|---|
| 10,783,586 B1 * | 9/2020 | Augustine | G06Q 40/08 |
| 10,783,587 B1 * | 9/2020 | Augustine | G06Q 40/08 |
| 11,242,039 B2 * | 2/2022 | Takaki | B60T 7/22 |
| 2020/0286310 A1 * | 9/2020 | Carver | G07C 5/0816 |
| 2021/0179111 A1 * | 6/2021 | Kim | B60W 30/143 |
| 2021/0394726 A1 * | 12/2021 | Choi | B60G 17/0185 |
| 2022/0227382 A1 * | 7/2022 | Kuehner | B60W 50/0097 |
| 2022/0379924 A1 * | 12/2022 | Foster | B60W 30/16 |
| 2022/0388503 A1 * | 12/2022 | Kim | G06V 20/58 |
| 2023/0037767 A1 * | 2/2023 | Yang | G08G 1/167 |
| 2023/0054037 A1 * | 2/2023 | Switkes | G05D 1/244 |

(Continued)

FOREIGN PATENT DOCUMENTS

| | | | | |
|---|---|---|---|---|
| CA | 3112557 A1 * | 10/2021 | ............. | G06N 20/00 |
| DE | 112021001994 T5 * | 1/2023 | ............. | G06N 3/045 |

(Continued)

*Primary Examiner* — Atul Trivedi
(74) *Attorney, Agent, or Firm* — Oliff PLC

(57) ABSTRACT

An execution device is configured to execute a detection process for detecting a state that a preceding vehicle is approaching a host vehicle, an acquisition process for acquiring a deceleration of the host vehicle and a deceleration of the preceding vehicle when the preceding vehicle is approaching the host vehicle, and a calculation process for calculating, based on the deceleration of the host vehicle and the deceleration of the preceding vehicle, an index value indicating a tendency of a brake operation force of a driver of the host vehicle.

3 Claims, 2 Drawing Sheets

(56) References Cited

U.S. PATENT DOCUMENTS

| | | | |
|---|---|---|---|
| 2024/0085914 A1* | 3/2024 | Topan | G05D 1/0253 |
| 2024/0383401 A1* | 11/2024 | Shaughnessy | B60Q 9/008 |
| 2025/0058795 A1* | 2/2025 | Vertegaal | B60K 35/81 |

FOREIGN PATENT DOCUMENTS

| | | | | |
|---|---|---|---|---|
| EP | 3815952 A1 | * | 5/2021 | B60K 35/26 |
| JP | 2004-139337 A | | 5/2004 | |
| JP | 2013-206297 A | | 10/2013 | |
| JP | 2019-012481 A | | 1/2019 | |
| JP | 7674911 B2 | * | 5/2025 | G06N 3/0464 |
| KR | 20230001524 A | * | 1/2023 | G06V 10/7753 |
| RU | 2737069 C1 | * | 11/2020 | B60T 8/00 |
| WO | WO-2022196418 A1 | * | 9/2022 | G08G 1/16 |

\* cited by examiner

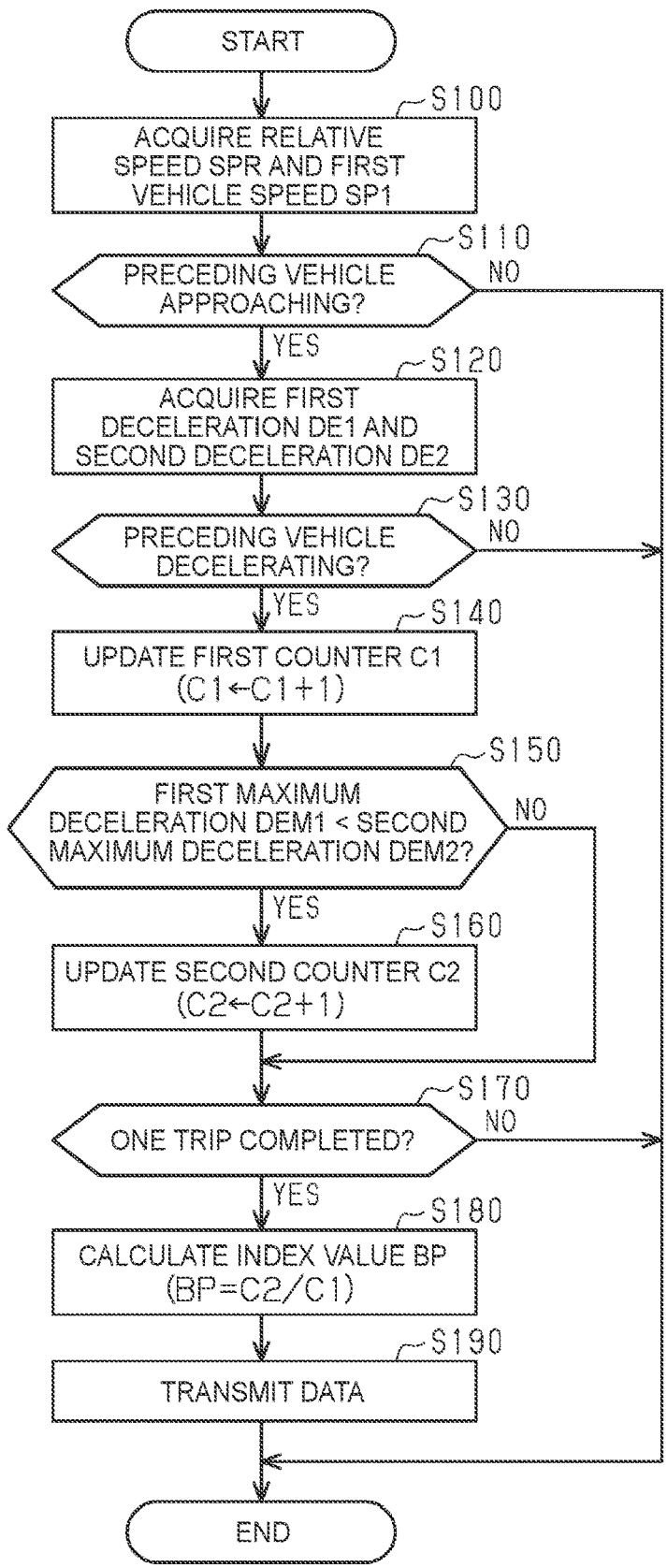

INFORMATION PROCESSING DEVICE

CROSS-REFERENCE TO RELATED APPLICATION

This application claims priority to Japanese Patent Application No. 2023-017029 filed on Feb. 7, 2023, incorporated herein by reference in its entirety.

BACKGROUND

1. Technical Field

The present disclosure relates to an information processing device.

2. Description of Related Art

For example, Japanese Unexamined Patent Application Publication No. 2019-12481 (JP 2019-12481 A) describes a driving diagnosis device that extracts a danger avoidance operation among driving operations of a driver of a vehicle.

SUMMARY

When a preceding vehicle traveling in front of a host vehicle is approaching the host vehicle, a driver of the host vehicle performs a brake operation to keep an inter-vehicle distance. Regarding the brake operation, when the driver applies a strong brake operation that increases a deceleration of the host vehicle without consideration for a following vehicle traveling behind the host vehicle, a driver of the following vehicle will also be forced to apply a strong brake operation. Therefore, calculating an index value for diagnosing whether the driver of the host vehicle is driving with consideration for the following vehicle is desired.

A first aspect of the present disclosure is an information processing device for a vehicle. The information processing device includes an execution device. The execution device is configured to execute a detection process for detecting a state in which a preceding vehicle is approaching a host vehicle; an acquisition process for acquiring a deceleration of the host vehicle and a deceleration of the preceding vehicle when the preceding vehicle is approaching the host vehicle; and a calculation process for calculating, based on the deceleration of the host vehicle and the deceleration of the preceding vehicle, an index value indicating a tendency of a brake operation force of a driver of the host vehicle.

In the first aspect, the detection process may be a process for determining, based on a relative speed between the preceding vehicle and the host vehicle, a state that the preceding vehicle is approaching the host vehicle.

In the first aspect, the index value may be the number of times that a maximum absolute value of the deceleration of the host vehicle is smaller than a maximum absolute value of the deceleration of the preceding vehicle.

In the first aspect, the index value may be a value acquired by dividing the number of times that a maximum absolute value of the deceleration of the host vehicle is smaller than a maximum absolute value of the deceleration of the preceding vehicle by the number of times that the preceding vehicle decelerates.

The first aspect of the present disclosure enables calculation of an index value suitable for diagnosing whether the driver of the host vehicle is driving with consideration for the following vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing a procedure of processing executed by a brake electronic control unit (ECU) according to the embodiment.

DETAILED DESCRIPTION OF EMBODIMENTS

System Configuration of Vehicle

Figure 1:
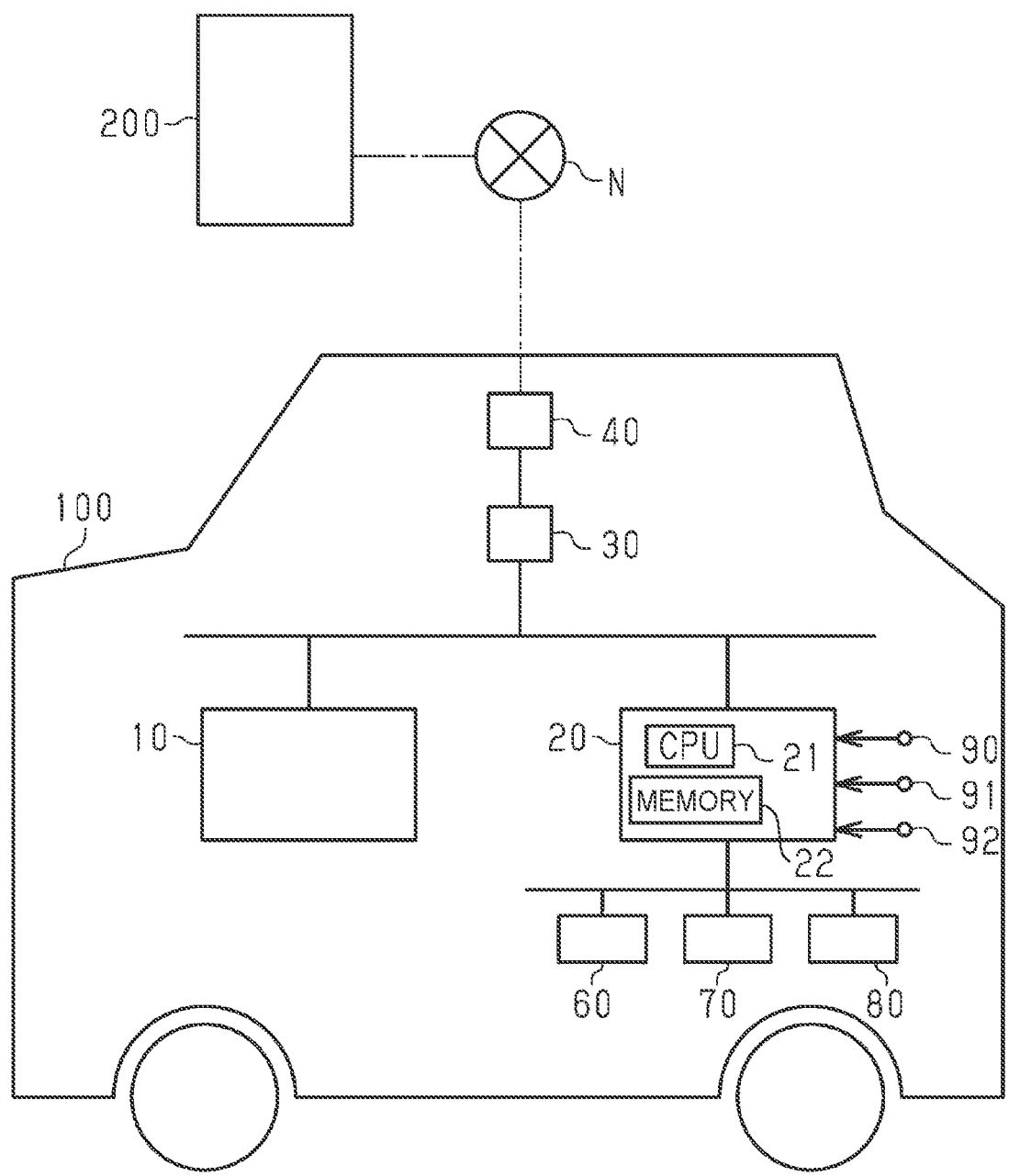
FIG. 1 is a schematic diagram showing a system configuration of a vehicle according to an embodiment.

An embodiment of an information processing device will be described below with reference to the drawings. As shown in FIG. 1, a vehicle 100 includes an advanced driving assistance system-electronic control unit (ADAS-ECU) 10, a brake ECU 20, a central ECU 30, and a communication device 40.

The ADAS-ECU 10 is a computer including a central processing unit (CPU), a memory, an input interface, an output interface, and the like. The ADAS-ECU 10 constitutes a driving assistance system of the vehicle 100. Examples of the driving assistance system include an automated driving system, an automated parking system, and an advanced driving assistance system. The ADAS-ECU 10 acquires signals from a plurality of sensors (not shown). Examples of the sensors include a camera that captures the front of a vehicle, a radar, and a light detection and ranging (LiDAR) sensor.

The brake ECU 20 is a computer including a CPU 21, a memory 22, an input interface, an output interface, and the like, and constitutes an information processing device. The brake ECU 20 executes various types of controls as the CPU 21 executes a program stored in the memory 22. In the present embodiment, the CPU 21 that performs such controls is an execution device.

The brake ECU 20 controls a traveling state of the vehicle 100 by controlling various types of actuator systems provided in the vehicle 100, based on a request from the ADAS-ECU 10. Examples of the various types of actuator systems include a powertrain system 60, a brake system 70, and a steering system 80.

An acceleration sensor 90, a first wheel speed sensor 91, a second wheel speed sensor 92, and the like, are connected to the brake ECU 20. The acceleration sensor 90 detects an acceleration in the front-rear direction of the vehicle 100. The first wheel speed sensor 91 detects a rotational speed of a driving wheel of the vehicle 100. The second wheel speed sensor 92 detects the rotational speed of a driven wheel of the vehicle 100.

The communication device 40 is a communication module that performs two-way communication with a server 200 through the network N outside the vehicle. The server 200 collects, analyzes, and calculates various types of data. The central ECU 30 is a computer including a CPU, a memory, an input interface, an output interface, and the like. The central ECU 30, the ADAS-ECU 10, and the brake ECU 20 are connected to an in-vehicle network, and those ECUs intercommunicate with each other. In addition, the central ECU 30 intercommunicates with the server 200 using the communication device 40.

Calculation of Index Value

The brake ECU 20 calculates an index value BP that indicates a tendency of a driver's brake operation force of the vehicle 100 that is a host vehicle.

FIG. 2 shows the procedure of processing for calculating the index value BP. This processing is realized by the CPU 21 of the brake ECU 20 repeatedly executing a program stored in the memory 22. In addition, hereinafter, a step number of each processing is represented by a number prefixed with "S".

In a series of processing shown in FIG. 2, the CPU 21 first acquires a relative speed SPR and a first vehicle speed SP1 (S100). The relative speed SPR is a relative speed of the preceding vehicle with respect to the host vehicle. The brake ECU 20 acquires the relative speed SPR from the ADAS-ECU 10. The ADAS-ECU 10 calculates an inter-vehicle distance between the host vehicle and the preceding vehicle based on information acquired from a sensor and the like. Then, the relative speed SPR is calculated by time-differentiating the inter-vehicle distance. Note that, a negative value of the relative speed SPR indicates that the inter-vehicle distance between the host vehicle and the preceding vehicle is short, and a positive value of the relative speed SPR indicates that the inter-vehicle distance is long.

The first vehicle speed SP1 is a vehicle speed of the host vehicle. The brake ECU 20 calculates the vehicle speed SP of the host vehicle based on a detection signal of the second wheel speed sensor 92, and substitutes the calculated value for the first vehicle speed SP1.

Next, the CPU 21 executes processing for determining whether the preceding vehicle is approaching the host vehicle (S110). In S110, the brake ECU 20 determines that the preceding vehicle is approaching the host vehicle when the acquired relative speed SPR remains negative for a predetermined time or longer. The processing of S110 is a detection process for detecting the state that the preceding vehicle is approaching the host vehicle.

When determining that the preceding vehicle is approaching the host vehicle (S110: YES), the CPU 21 executes an acquisition process for acquiring the first deceleration DE1 and the second deceleration DE2 (S120). The first deceleration DE1 is a deceleration of the host vehicle. The brake ECU 20 calculates the deceleration of the host vehicle by time-differentiating the vehicle speed SP of the host vehicle calculated based on the detection signal of the second wheel speed sensor 92, and substitutes the calculated value for the first deceleration DE1. Note that, in the present embodiment, the deceleration is a value indicated by a negative value. Therefore, in the present embodiment, a small deceleration means that the absolute value of the deceleration is small.

The second deceleration DE2 is the deceleration of the preceding vehicle. The brake ECU 20 calculates the vehicle speed SP of the preceding vehicle by adding the relative speed SPR to the vehicle speed SP of the host vehicle calculated based on the detection signal of the second wheel speed sensor 92. Then, the deceleration of the preceding vehicle is calculated by time-differentiating the calculated vehicle speed SP of the preceding vehicle, and the calculated value is substituted for the second deceleration DE2.

Next, the CPU 21 determines whether the preceding vehicle has decelerated (S130). In S130, the brake ECU 20 determines that the preceding vehicle has decelerated when the acquired second deceleration DE2 is equal to or smaller than a predetermined threshold DE2ref, that is, the second deceleration DE2 is a negative value and its absolute value is larger than the absolute value of the threshold DE2ref.

In S130, when determining that the preceding vehicle has decelerated (S130: YES), the CPU 21 updates the value of a first counter C1 (S140). An initial value of the first counter C1 is "0". Then, in S140, the CPU 21 updates the first counter C1 by adding a predetermined additional value, such as "1", to a current value of the first counter C1. The value of the first counter C1 indicates the number of times the preceding vehicle decelerates.

Next, the CPU 21 determines whether the first maximum deceleration DEM1 is smaller than the second maximum deceleration DEM2, that is, the absolute value of the first maximum deceleration DEM1 is smaller than the absolute value of the second maximum deceleration DEM2 (S150).

The first maximum deceleration DEM1 is the maximum value of the first deceleration DE1 acquired when the preceding vehicle has been determined to be decelerated. When the acquired first deceleration DE1 exceeds the first maximum deceleration DEM1, the CPU 21 substitutes the acquired first deceleration DE1 for the first maximum deceleration DEM1 to separately perform the processing for updating the first maximum deceleration DEM1.

The second maximum deceleration DEM2 is the maximum value of the second deceleration DE2 acquired when the preceding vehicle has been determined to be decelerated. When the acquired second deceleration DE2 exceeds the second maximum deceleration DEM2, the CPU 21 substitutes the acquired second deceleration DE2 for the second maximum deceleration DEM2 to separately perform the processing for updating the second maximum deceleration DEM2.

In S150, when determining that the first maximum deceleration DEM1 is smaller than the second maximum deceleration DEM2 (S150: YES), the CPU 21 updates the value of the second counter C2 (S160). The initial value of the second counter C2 is "0".

Then, in S160, the CPU 21 updates the second counter C2 by adding a predetermined additional value, such as "1", to a current value of the second counter C2. The value of the second counter C2 indicates the number of times determined that the maximum absolute value of the first deceleration DE1 is smaller than the maximum absolute value of the second deceleration DE2.

When the processing of S160 is completed, or when a negative determination is made in S150, the CPU 21 determines whether one trip of the vehicle 100 has been completed (S170). In S170, the CPU 21 determines that one trip of the vehicle 100 has been completed, for example, when an ignition switch of the vehicle 100 is turned off by the driver.

When determining that one trip of the vehicle 100 has been completed (S170: YES), the CPU 21 executes the calculation process for calculating the index value BP (S180). As the calculation process of S180, the CPU 21 calculates the value acquired by dividing the value of the second counter C2 by the value of the first counter C1. Then, the CPU 21 executes the processing for substituting the calculated value for the index value BP.

After calculating the index value BP, the CPU 21 executes data transmission processing for transmitting the index value BP to the central ECU 30 (S190). Note that, after finishing the processing of S190, the CPU 21 performs processing for resetting each value of the first counter C1, the second counter C2, and the index value BP to "0".

When the processing of S190 is completed, or when a negative determination is made in any of the processing of S110, S130, and S170, the CPU 21 ends the present processing.

Note that when the index value BP is transmitted from the brake ECU 20 to the central ECU 30 by executing the processing of S190, the central ECU 30 executes processing to transmit the index value BP to the server 200 together with vehicle ID, which is identification information of the vehicle 100. The server 200 refers to the index value BP as one of the index values when performing a driving diagnosis for diagnosing the driving tendency of the driver who drives the vehicle 100.

Action and Effect

The action and effect of the present embodiment will be described. (1) Whether the driver of the host vehicle tends to perform a strong brake operation can be determined based on the deceleration of the host vehicle. Here, since the deceleration of the host vehicle alone is not comparable, it is difficult to appropriately determine whether the driver of the host vehicle tends to perform a strong brake operation is difficult.

In this regard, the CPU 21 of the present embodiment calculates the index value BP, which indicates the tendency of the brake operation force of the driver of the host vehicle, based on the first deceleration DE1, which is the deceleration of the host vehicle, and the second deceleration DE2, which is the deceleration of the preceding vehicle. Therefore, the index value BP is calculated as a relative value considering not only the brake operation force of the driver of the host vehicle, but also the brake operation force of the other driver driving the preceding vehicle. Therefore, the index value BP can be calculated as the index value suitable for diagnosing whether the driver of the host vehicle is driving with consideration for the following vehicle.

(2) The CPU 21 calculates the first counter C1 as the value indicating the number of times the preceding vehicle decelerates. The CPU 21 also calculates the second counter C2 as the value indicating the number of times the absolute value of the first maximum deceleration DEM1 is smaller than the absolute value of the second maximum deceleration DEM2. The value of the second counter C2 reflects the number of times the driver of the host vehicle performed a weaker brake operation than the driver of the preceding vehicle. Then, the CPU 21 calculates the index value BP by dividing the value of the second counter C2 by the value of the first counter C1.

Therefore, the index value BP reflects the ratio of the number of times the driver of the host vehicle performed a weaker brake operation than the driver of the preceding vehicle, out of the number of times the preceding vehicle decelerated. Therefore, based on the index value BP, it is possible to calculate the frequency with which the driver of the host vehicle drives with consideration for the following vehicle when the preceding vehicle decelerates.

Modifications

Note that the above embodiment can be implemented with the following modifications. The above embodiment and the following modifications can be combined with each other within a technically consistent range to be implemented.

The value of the second counter C2 may be substituted for the value of the index value BP. In this case, the index value BP reflects the number of times the driver of the host vehicle performed a weaker brake operation than the driver of the preceding vehicle. Therefore, based on the index value BP, it is possible to calculate the number of times the driver of the host vehicle has driven with consideration for the following vehicle.

Although the determination that the preceding vehicle is approaching the host vehicle is made based on the relative speed SPR in the detection process of S110, other values may be used for the determination. The acceleration sensor 90, the first wheel speed sensor 91, and the second wheel speed sensor 92 are connected to the brake ECU 20. Alternatively, any one of these sensors may be connected to another ECU, and the detection value of the sensor may be input from the other ECU to the brake ECU 20 through the in-vehicle network.

The information processing device configured as a computer is not limited to one that includes the CPU 21 and the memory 22 and executes software processing. For example, a dedicated hardware circuit such as an application-specific integrated circuit (ASIC) may be provided to perform hardware processing for at least part of what is software processed in the above embodiment. That is, the information processing device may have any one of the following configurations (a) to (c). (a) A processing device for executing all of the above processing according to a program, and a program storage device such as a read only memory (ROM) that stores the program. (b) A processing device and a program storage device for executing part of the above processing according to a program, and a dedicated hardware circuit for executing the remaining processing. (c) A dedicated hardware circuit for executing all of the above processing. Here, there may be a plurality of software execution devices provided with the processing device and the program storage device, or may be a plurality of dedicated hardware circuits.

What is claimed is:

1. A host vehicle comprising:
   a brake system;
   a plurality of wheels, a vehicle wheel speed sensor provided on at least one of the plurality of wheels;
   a plurality of sensors configured to detect a preceding vehicle that is located in front of the host vehicle in a traveling direction of the host vehicle, the plurality of sensory including a camera that captures an image in front of the host vehicle, a radar sensor and a light detection and ranging (LiDAR) sensor; and
   an information processing device mounted on the host vehicle, the information processing device including a processor and memory storing a program that is executed by the processor to:
   acquire an inter-vehicle distance between the host vehicle and the preceding vehicle that is determined based on information output by one or more of the plurality of sensors;
   calculate a speed of the host vehicle based on information output by the vehicle wheel speed sensor of the host vehicle;
   acquire a relative speed of the preceding vehicle with respect to the host vehicle, the relative speed being determined by time-differentiating the inter-vehicle distance between the host vehicle and the preceding vehicle;
   determine that the preceding vehicle is approaching the host vehicle when the relative speed that has been acquired remains negative for at least a predetermined time period;
   when the processor has determined that the preceding vehicle is approaching the host vehicle, calculate a first deceleration value which is a deceleration of the host vehicle and calculate a second deceleration value which is a deceleration of the preceding vehicle, the first deceleration value being calculated by time-differentiating the speed of the host vehicle that was calculated based on the information output by the vehicle wheel speed sensor of the host vehicle, the second deceleration value being calculated by time-differentiating a sum of the relative speed and the speed of the host vehicle; and calculate an index value indicating a tendency of a brake operation force of the brake system of the host vehicle by a driver of the host vehicle, the index value being calculated from the first deceleration value of the host vehicle and the second deceleration value of the preceding vehicle and being indicative of a frequency by which the driver of the host vehicle performed a weaker brake operation than the preceding vehicle.

2. The host vehicle according to claim 1, wherein the index value is calculated from a number of times that a maximum absolute value of the first deceleration value of the host vehicle is smaller than a maximum absolute value of the second deceleration value of the preceding vehicle.

3. The host vehicle according to claim 1, wherein the index value is acquired by dividing (1) a number of times that a maximum absolute value of the first deceleration value of the host vehicle is smaller than a maximum absolute value of the second deceleration value of the preceding vehicle by (2) a number of times that the preceding vehicle decelerates.

\* \* \* \* \*